(12) United States Patent  
Inkala et al.

(10) Patent No.: US 10,248,293 B2  
(45) Date of Patent: Apr. 2, 2019

(54) METHOD, APPARATUS, COMPUTER PROGRAM AND USER INTERFACE

(71) Applicant: Nokia Technologies Oy, Espoo (FI)

(72) Inventors: Auli Inkala, Tyrnava (FI); Liisa Laksy, Oulu (FI); Markku Heiskala, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 13/631,746

(22) Filed: Sep. 28, 2012

(65) Prior Publication Data

US 2013/0086527 A1 Apr. 4, 2013

Related U.S. Application Data

(63) Continuation-in-part of application No. 13/250,450, filed on Sep. 30, 2011, now abandoned.

(51) Int. Cl.  
*G06F 3/0484* (2013.01)

(52) U.S. Cl.  
CPC .................. *G06F 3/0484* (2013.01)

(58) Field of Classification Search  
CPC .. G06F 3/0486; G06F 3/04817; G06F 3/0482; G06F 3/04842; G06F 3/04886; G06F 17/211  
USPC ....... 715/203, 209, 210, 243, 246, 251, 764, 715/769, 810  
See application file for complete search history.

(56) References Cited

U.S. PATENT DOCUMENTS

| | | | |
|---|---|---|---|
| 8,510,226 B2 | 8/2013 | Coley et al. | |
| 2002/0122076 A1* | 9/2002 | Nakaki | 345/847 |
| 2005/0045721 A1* | 3/2005 | Wang et al. | 235/440 |
| 2005/0125744 A1 | 6/2005 | Hubbard et al. | |
| 2006/0242596 A1 | 10/2006 | Armstrong | |
| 2007/0038934 A1* | 2/2007 | Fellman | 715/700 |
| 2007/0067734 A1 | 3/2007 | Cunningham et al. | |
| 2008/0235602 A1* | 9/2008 | Strauss et al. | 715/762 |
| 2009/0150820 A1* | 6/2009 | Hayman | 715/772 |

(Continued)

FOREIGN PATENT DOCUMENTS

| | | |
|---|---|---|
| CN | 101483689 A | 7/2009 |
| CN | 101937339 A | 1/2011 |

(Continued)

OTHER PUBLICATIONS

International Search Report and Written Opinion received for corresponding Patent Cooperation Treaty Application No. PCT/FI2012/050923, dated Jan. 14, 2013, 12 pages.

Office Action received for corresponding Korean Application No. 2012-0108260, dated Nov. 18, 2013, 4 pages.

Office Action received for corresponding U.S. Appl. No. 13/250,450, dated Dec. 20, 2013, 40 pages.

(Continued)

*Primary Examiner* — Wilson W Tsui  
(74) *Attorney, Agent, or Firm* — Alston & Bird LLP

(57) ABSTRACT

A method, apparatus, computer program and user interface wherein the method comprises: providing a plurality of user interface items in a menu structure where each user interface item is associated with at least one function of an apparatus; determining that a function associated with a user interface item is unavailable; removing the user interface item associated with the unavailable function from the menu structure; and providing a replacement user interface item in the position of the menu structure previously occupied by the removed user interface item.

27 Claims, 7 Drawing Sheets

(56) References Cited

U.S. PATENT DOCUMENTS

| | | | |
|---|---|---|---|
| 2009/0178005 A1 | 7/2009 | Jheng | |
| 2010/0011304 A1* | 1/2010 | van Os | 715/762 |
| 2010/0037104 A1* | 2/2010 | Jung et al. | 714/49 |
| 2010/0211898 A1 | 8/2010 | Bhojani et al. | |
| 2011/0022984 A1* | 1/2011 | van der Meulen et al. | 715/830 |
| 2011/0119615 A1* | 5/2011 | Cisler | G06F 9/4443 715/772 |
| 2011/0242361 A1* | 10/2011 | Kuwahara | A63F 13/10 348/231.4 |
| 2012/0084689 A1* | 4/2012 | Ledet et al. | 715/769 |
| 2012/0110480 A1* | 5/2012 | Kravets | 715/760 |

FOREIGN PATENT DOCUMENTS

| | | |
|---|---|---|
| CN | 102158596 A | 8/2011 |
| CN | 102158956 A | 8/2011 |
| KR | 2010-0080472 A | 7/2010 |

OTHER PUBLICATIONS

Office Action from Korean Application No. 2012-0108260, dated May 30, 2014.
Office Action from Korean Patent Application No. 2012-0108260, dated Aug. 5, 2014.
Office Action from U.S. Appl. No. 13/250,450, dated Jul. 17, 2014.
Office Action for Korean Application No. 2012-0108260 dated May 28, 2015.
Office Action received for Chinese Application No. 201280053016. 8, dated Apr. 6, 2016, 8 pages.
Office Action received for Chinese Application No. 201280053016. 8, dated Feb. 16, 2017, with English translation, 15 pages.
Office Action received for Chinese Application No. 201280053016. 8, dated Apr. 8, 2018 with English Summary, 7 pages.
Office Action received for Chinese Application No. 201280053016. 8, dated Aug. 30, 2017, 8 pages.
Notification of Reason for Refusal for Korean Application No. 10-2012-0108260 dated May 16, 2017, 5 pages.

* cited by examiner

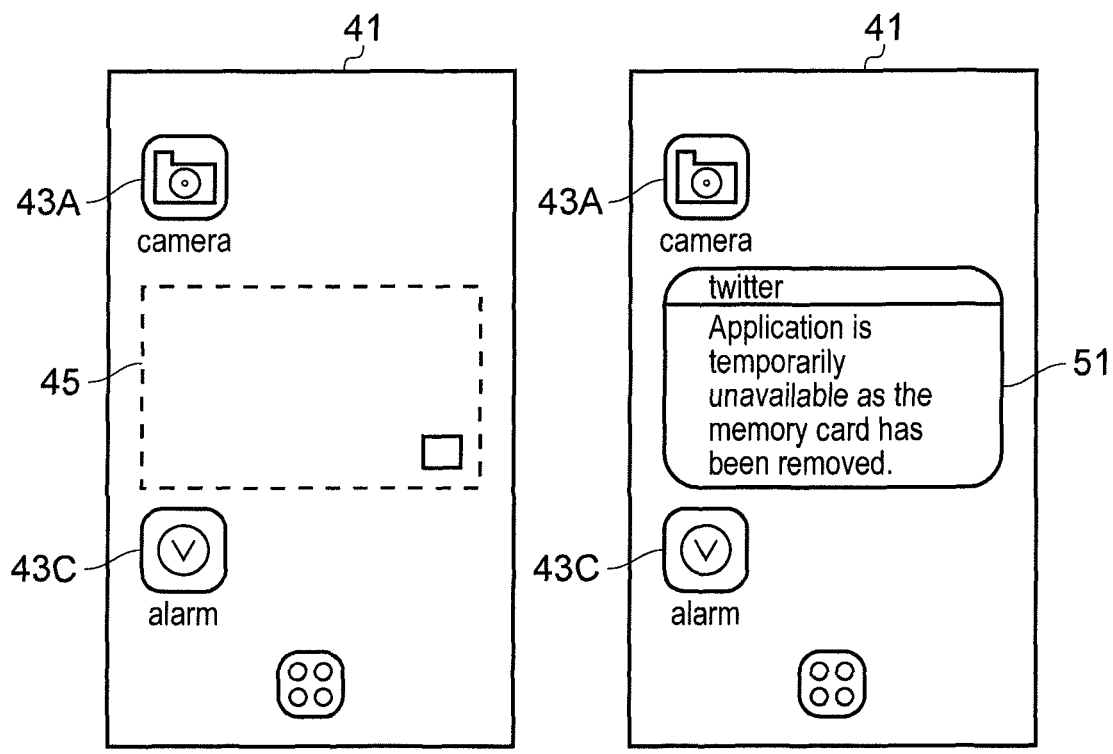

METHOD, APPARATUS, COMPUTER PROGRAM AND USER INTERFACE

TECHNOLOGICAL FIELD

Embodiments of the present invention relate to a method, apparatus, computer program and user interface. In particular, they relate to a method, apparatus, computer program and user interface which provide a plurality of user interface items which enable a user to access the functions of the apparatus.

BACKGROUND

Apparatus which provide user interface items which enable a user to access the functions of the apparatus are known. Such user interface items may comprise graphical user interface items such as icons or widgets which are configured such that user selection of the items causes access to the functions and applications associated with the selected user interface items.

The user interface items may be arranged within a home screen or a menu structure, such as a hierarchical menu structure. The apparatus may be configured to enable the user of the apparatus to arrange the respective user interface items into an order which they find convenient to use.

BRIEF SUMMARY

According to various, but not necessarily all, embodiments of the invention there is provided a method comprising: providing a plurality of user interface items in a menu structure where each user interface item is associated with at least one function of an apparatus; determining that a function associated with a user interface item is unavailable; removing the user interface item associated with the unavailable function from the menu structure; and menu structure providing a replacement user interface item in the position of the menu structure previously occupied by the removed user interface item.

The menu structure may be a pre-defined menu structure and the providing of the replacement user interface items may maintain the pre-defined menu structure.

In some embodiments, the replacement user interface item reserves a position in the menu structure for restoring the removed user interface item to. The position in the menu structure may be moveable. In some embodiments of the invention the positions of the user interface items within the menu structure may be defined by a user.

In some embodiments of the invention the menu structure may comprise a home screen.

In some embodiments of the invention the function associated with the user interface item may be determined to be unavailable due to the removal of a removable memory.

In some embodiments of the invention the replacement user interface item may comprise an indication of the removed user interface item.

In some embodiments of the invention the replacement user interface item may be configured to cause information regarding the unavailable function to be provided in response to user selection of the user interface item.

In some embodiments of the invention user selection of a user interface item may enable access to the at least one function associated with the user interface item.

In some embodiments of the invention the method may further comprise determining that the function which is associated with the removed user interface item is available again, and providing the removed user interface item back in the menu structure.

Apparatus comprising means for implementing the invention may also be provided.

According to various, but not necessarily all, embodiments of the invention there is also provided an apparatus comprising: at least one processor; and at least one memory including computer program code; wherein the at least one memory and the computer program code are configured to, with the at least one processor, enable the apparatus to: provide a plurality of user interface items in a menu structure where each user interface item is associated with at least one function of an apparatus; determine that a function associated with a user interface item is unavailable; remove the user interface item associated with the unavailable function from the menu structure; and provide a replacement user interface item in the position of the menu structure previously occupied by the removed user interface item.

In some embodiments of the invention the menu structure may be pre-defined and the providing of the replacement user interface items maintains the menu structure.

In some embodiments of the invention the positions of the user interface items within the menu structure may be defined by a user.

In some embodiments of the invention the menu structure may comprise a home screen.

In some embodiments of the invention the function associated with the user interface item may be determined to be unavailable due to the removal of a removable memory.

In some embodiments of the invention the replacement user interface item may comprise an indication of the removed user interface item.

In some embodiments of the invention the replacement user interface item may be configured to cause information regarding the unavailable function to be provided in response to user selection of the user interface item.

In some embodiments of the invention the user selection of a user interface item may enable access to the at least one function associated with the user interface item.

In some embodiments of the invention the at least one memory and the computer program code may be further configured to, with the at least one processor, enable the apparatus to determine that the function which is associated with the removed user interface item is available again, and provide the removed user interface item back in the menu structure.

According to various, but not necessarily all, embodiments of the invention there is also provided a computer program comprising computer program instructions that, when executed by at least one processor, cause an apparatus at least to perform: providing a plurality of user interface items in a menu structure where each user interface item is associated with at least one function of an apparatus; determining that a function associated with a user interface item is unavailable; removing the user interface item associated with the unavailable function from the menu structure; and providing a replacement user interface item in the position of the menu structure previously occupied by the removed user interface item.

In some embodiments of the invention the menu structure may be pre-defined and the providing of the replacement user interface items maintains the menu structure.

In some embodiments of the invention there may also be provided a computer program comprising program instructions for causing a computer to perform the method as described above.

In some embodiments of the invention there may also be provided a physical entity embodying the computer program as described above.

In some embodiments of the invention there may also be provided an electromagnetic carrier signal carrying the computer program as described above.

According to various, but not necessarily all, embodiments of the invention there is also provided a user interface comprising: a display configured to display a plurality of user interface items in a menu structure where each user interface item is associated with at least one function of an apparatus; such that in response to determining that a function associated with a user interface item is unavailable, the user interface item associated with the unavailable function is removed from the menu structure and the menu structure is maintained by providing a replacement user interface item in the position of the menu structure previously occupied by the removed user interface item.

In some embodiments of the invention the menu structure comprises user interface items arranged in a menu structure comprising a home screen.

The apparatus may be for wireless communication.

In some embodiments, the apparatus comprises means for providing a plurality of user interface items in a menu structure where each user interface item is associated with at least one function of an apparatus; means for determining that a function associated with a user interface item is unavailable; means for removing the user interface item associated with the unavailable function from the menu structure; and means for providing a replacement user interface item to reserve a position in the menu structure previously occupied by the removed user interface item; means for enabling movement of the position of said replacement user interface item in said menu structure by a user, and means for restoring the removed user interface item to the moved position of said replacement graphical item when said function associated with said user interface item becomes available.

BRIEF DESCRIPTION

For a better understanding of various examples of embodiments of the present invention reference will now be made by way of example only to the accompanying drawings in which:

FIG. 1 schematically illustrates an apparatus according to an exemplary embodiment of the invention;

FIG. 2 schematically illustrates an apparatus according to another exemplary embodiment of the invention;

FIGS. 5A and 5B illustrate graphical user interfaces according to another exemplary embodiment of the invention;

DETAILED DESCRIPTION

Figure 1:
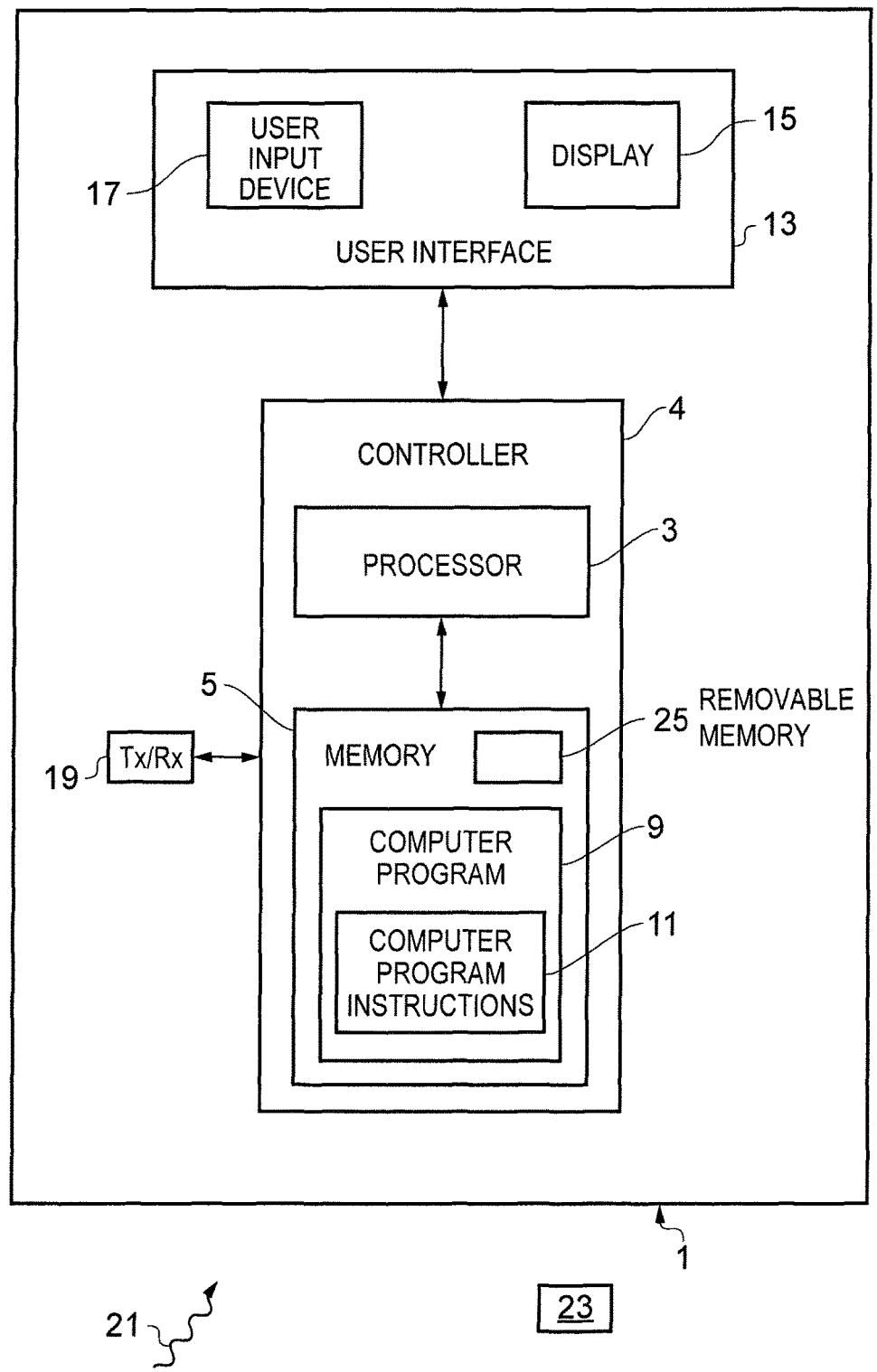

The Figures illustrate a method, apparatus, computer program and user interface wherein the method comprises: providing 31 a plurality of user interface items 43 in a menu structure where each user interface item 43 is associated with at least one function of an apparatus 1; determining 33 that a function associated with a user interface item 43 is unavailable; removing 35 the user interface item 43 associated with the unavailable function from the menu structure; and maintaining the menu structure by providing 37 a replacement user interface item 45 in the position of the menu structure previously occupied by the removed user interface item 43.

FIG. 1 schematically illustrates an apparatus 1 according to an embodiment of the invention. The apparatus 1 may be an electronic apparatus. The apparatus 1 may be, for example, a mobile cellular telephone, a tablet computer, a personal computer, a camera, a gaming device, a personal digital assistant, a personal music player or any other apparatus which may be configured to provide user interface items to a user. The apparatus 1 may be a handheld apparatus 1 which can be carried in a user's hand, handbag or jacket pocket for example.

Figure 2:
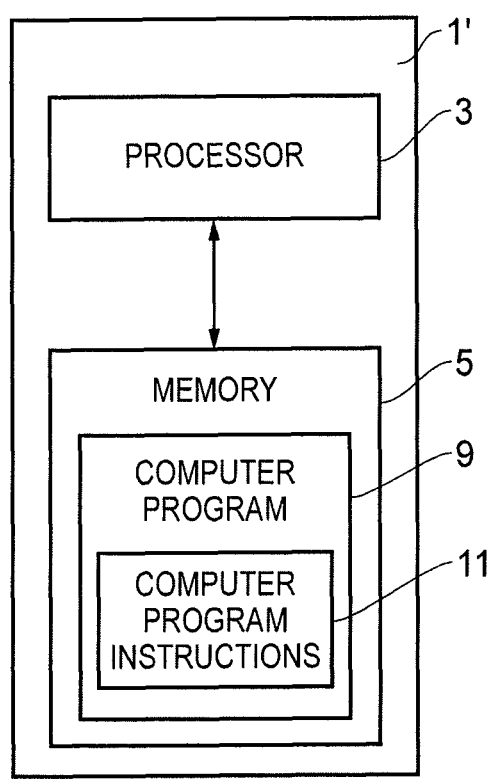

Only features referred to in the following description are illustrated in FIGS. 1 and 2. However, it should be understood that the apparatus 1 may comprise additional features that are not illustrated.

The apparatus 1 illustrated in FIG. 1 comprises: a user interface 13, a controller 4 and a transceiver 19. In the illustrated embodiment the controller 4 comprises at least one processor 3 and at least one memory 5 and the user interface 13 comprises a display 15 and a user input device 17. In the illustrated embodiment the transceiver 19 is shown as a single entity. It would be appreciated by a person skilled in the art that the transceiver 19 may comprise one or more separate receivers and transmitters.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc.) to be executed by such processors 3.

The controller 4 may be configured to control the apparatus 1 to perform a plurality of different functions. The functions may comprise, for example, communications functions such as telephone calls, email services or messages such as SMS (short message service) messages, MMS (multimedia message service) messages or instant messages, or access to social networking applications or any other communications functions. The functions may also comprise media functions such as access to image capturing devices, stored images or videos, access to music or other audio files or any other media functions. Other functions may include games or calendar applications or access to services such as satellite navigation systems. A person skilled in the art would appreciate that the apparatus 1 may be used for any number and range of functions and applications.

The controller 4 may also be configured to enable the apparatus 1 to provide a plurality of user interface items 43 in a menu structure where each user interface item 43 is associated with at least one function of an apparatus 1; determine that a function associated with a user interface item 43 is unavailable; remove the user interface item 43 associated with the unavailable function from the menu structure; and maintain the menu structure by providing a replacement user interface item 45 in the position of the menu structure previously occupied by the removed user interface item 43.

The at least one processor 3 is configured to receive input commands from the user interface 13 and also to provide output commands to the user interface 13. The at least one processor 3 is also configured to write to and read from the at least one memory 5. Outputs of the user interface 13 may be provided as inputs to the controller 4.

The user input device 17 provides means for enabling a user of the apparatus 1 to input information which may be used to control the apparatus 1. The user input device 17 may comprise any means which enables a user to input information into the apparatus 1. For example the user input device 17 may comprise a keypad or a touch sensitive display or a combination of different types of user input devices. In some embodiments of the invention the user input device 17 may also comprise means for enabling audio control of the apparatus 1. For example the user input device 17 may comprise a microphone and means for recognising audio inputs to enable voice control of the apparatus 1.

The display 15 may comprise any means which enables information to be displayed to a user of the apparatus 1. The information which is displayed may comprise a menu structure. The menu structure may comprise user interface items 43. The user interface items 43 may comprise images or text which are presented on the display 15. Each user interface item 43 may be associated with one or more functions of the apparatus 1. In some embodiments of the invention some of the user interface items 43 may be associated with more than one function, similarly some functions may be associated with more than one user interface item 43. The user interface items 43 may be selected, using the user input device 17 to cause access to the respective functions of the apparatus 1.

The display 15 may be configured to display graphical user interfaces 41 as illustrated in FIGS. 4A, 4B, 5A, 5B, 6A and 6B.

The exemplary apparatus 1 illustrated in FIG. 1 also comprises a transceiver 19. The transceiver 19 may comprise any means which enables the apparatus 1 transmit and receive information. The transceiver 19 may enable the respective communication functions of the apparatus 1.

The at least one memory 5 is configured to store a computer program 9 comprising computer program instructions 11 that control the operation of the apparatus 1 when loaded into the at least one processor 3. The computer program instructions 11 provide the logic and routines that enable the apparatus 1 to perform the exemplary methods illustrated in FIGS. 3 and 7. The at least one processor 3 by reading the at least one memory 5 is able to load and execute the computer program 9.

The computer program instructions 11 may provide computer readable program means configured to control the apparatus 1. The computer program instructions 11 may provide, when loaded into the controller 4; means for providing 31 a plurality of user interface items 43 in a menu structure where each user interface item 43 is associated with at least one function of an apparatus 1; determining 33 that a function associated with a user interface item 43 is unavailable; removing 35 the user interface item associated with the unavailable function from the menu structure; and maintaining the menu structure by providing 37 a replacement user interface item in the position of the menu structure previously occupied by the removed user interface item.

The computer program 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, or an article of manufacture that tangibly embodies the computer program 9. The delivery mechanism may be a signal configured to reliably transfer the computer program 9. The apparatus 1 may propagate or transmit the computer program 9 as a computer data signal.

The memory 5 may comprise a single component or it may be implemented as one or more separate components some or all of which may be integrated/removable and/or may provide permanent/semi-permanent/dynamic/cached storage. In the exemplary embodiment of the invention illustrated in FIG. 1 the memory comprises a removable component 25. The removable component 25 may comprise a removable storage medium such as a memory card or multimedia memory card. The removable memory component 25 may be configured to be connected and disconnected to the apparatus 1 by the user of the apparatus 1. The removable memory component 25 may be configured to store data such as text, pictures, video or audio. In some embodiments the removable memory component 25 may be configured to store computer program 9 which may enable the apparatus to perform one or more functions, for example, the memory card may comprise applications which may have been downloaded onto the apparatus 1.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 2 illustrates an apparatus 1' according to another embodiment of the invention. The apparatus 1' illustrated in FIG. 2 may be a chip or a chip-set. The apparatus 1' comprises at least one processor 3 and at least one memory 5 as described above in relation to FIG. 1. In the exemplary embodiment illustrated in FIG. 2 the removable memory component has not been illustrated. It is to be appreciated that in some embodiments of the invention the apparatus 1' may be configured to be connected a removable memory component such as the removable memory component 25 illustrated in FIG. 1.

Figure 3:
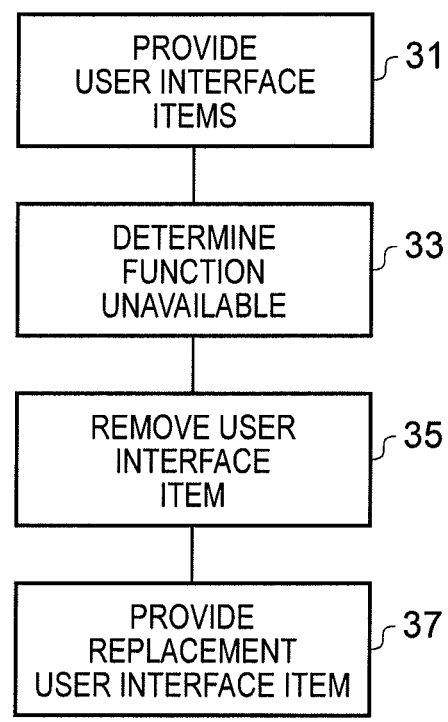
FIG. 3 is a block diagram which schematically illustrates a method according to an exemplary embodiment of the invention.

FIG. 3 schematically illustrates a method according to an exemplary embodiment of the invention.

At block 31 a plurality of user interface items 43 are provided. The user interface items 43 may comprise any graphic, text or other information which may be displayed on the display 15 and which is associated with one or more functions of the apparatus 1 such that user selection of the user interface item 43 causes access to the one or more functions of the apparatus 1.

The user interface items 43 may be arranged in a menu structure. The menu structure may be pre-defined in that the user interface items are arranged into the structure before the method of FIG. 3 is carried out. It is to be appreciated that, in some embodiments of the invention, the menu structure may be dynamic and so the structure may change for example, when new functions or items are downloaded onto the apparatus 1 or if the user wishes to rearrange the user interface items 43 into a different order.

Each user interface item 43 may be assigned to a position within the menu structure. The positions of the respective user interface items 43 within the menu structure may be determined automatically, for example, the user interface items 43 associated with the most commonly used functions may be positioned more prominently within the menu structure than less frequently used functions. In other embodiments of the invention the positions of the user interface items within the menu structure may be defined by the user of the apparatus 1. The apparatus 1 may be configured to enable the user to arrange the user interface items 43 within the menu structure in the manner which they consider to be most convenient for their own use.

In some embodiments of the invention the menu structure may comprise a home screen. The home screen may be a default graphical user interface which may be provided as an initial graphical user interface whenever a user turns the apparatus 1 on or accesses certain applications of the apparatus 1. In some embodiments of the invention the user input device 17 may provide shortcuts so that a user of the apparatus 1 can quickly and easily access the home screen. In some embodiments of the invention the home screen may be displayed when the apparatus 1 is in an idle mode of operation.

In some embodiments of the invention the menu structure may comprise a hierarchical menu structure or any other multi-level menu structure. The user input device 17 may be configured to enable the user to navigate through the menu structure.

At block 33 the controller 4 determines that a function associated with at least one of the user interface items 43 is not available. In some embodiments of the invention a function may not be available due to removal of a removable memory component 25. For example, data stored in a removable memory component 25 may be required to implement one or more functions. If the removable memory component 25 is removed then these functions become unavailable to the apparatus 1. In such embodiments of the invention the controller 4 may determine that the function is unavailable by determining that the removable memory component 25 has been removed.

In other embodiments of the invention a function may become unavailable due to a technical issue which may include, for example, corruption of a file, issues at a remote server, connectivity issues or the unavailability of a communication service or any other technical issue. In such embodiments of the invention the controller 4 may determine that the function is unavailable by detecting the technical issue or by receiving a notification of a technical issue.

In some embodiments of the invention a function may be unavailable because the authorization of the user of the apparatus 1 to use the function may have expired. For example the user may download an application which authorizes them to use the functions of the applications for a specified time period. Once the time period has expired the user may no longer be able to use the functions of the application unless they renew the license associated with the application.

At block 35 the controller 4 removes the user interface item 43 associated with the unavailable function from the menu structure and at block 37 replaces the removed user interface item 43 with a replacement user interface item 45. The replacement user interface item 45 occupies the position within the menu structure which was previously occupied by the removed user interface item 43. This enables the menu structure to be maintained even when functions are unavailable.

The replacement user interface item 45 may differ from the other user interface items 43 in that it is not directly associated with a function of the apparatus 1 so that user selection of the replacement user interface item 45 does not cause access to the functions of the apparatus 1.

The replacement user interface item 45 may be visually distinctive to the other user interface items 43. The graphic or text or other information which comprises the replacement user interface item 45 may be such that it enables a user of the apparatus 1 to easily determine that it is a replacement user interface item 45 which does not enable access to a specific function.

In some embodiments of the invention the replacement user interface item 45 may comprise an indication of the function or applications associated with the user interface item 43 which it has replaced. This may enable a user to easily determine which functions are currently unavailable.

In some embodiments of the invention the user input device 17 may be configured to enable a user to select the replacement user interface item 45. In response to user selection of the replacement user interface item 45 the apparatus 1 may be configured to provide information regarding the unavailable function, for example, it may provide a notification 51 that a removable memory 25 has been removed or that there are technical issues with an application or that the authorization to use the function has expired.

The replacement user interface item 45 may be configured to be moved within the menu structure in the same way as the other user interface items 43. For example a user may wish to move the replacement user interface item 45 within the menu structure. In some embodiments of the invention the user may be able to remove the replacement user interface item 45 from the menu structure.

Figure 4A:
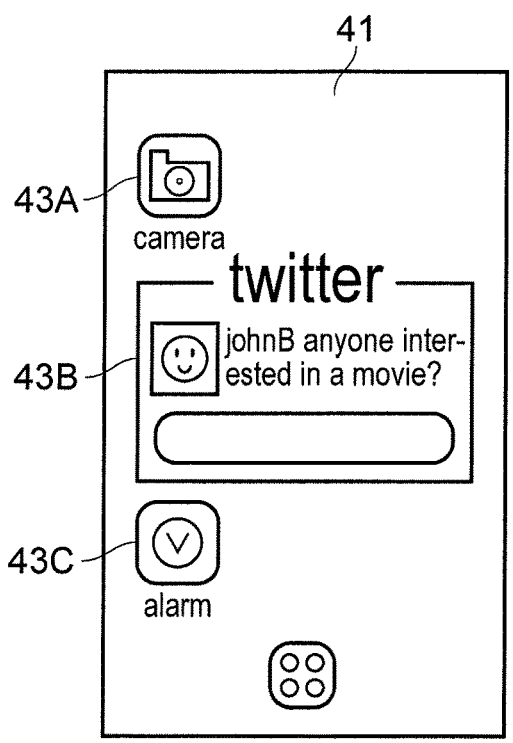
FIGS. 4A and 4B illustrate graphical user interfaces according to an exemplary embodiment of the invention.
Figure 4B:
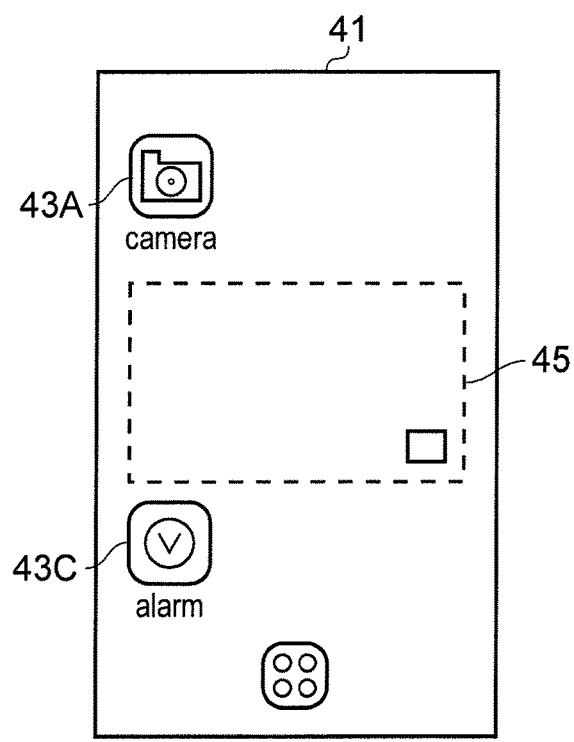

FIGS. 4A and 4B illustrate graphical user interfaces 41 according to an exemplary embodiment of the invention. The graphical user interface 41 may be displayed on the display 15 of the apparatus 1 illustrated in FIG. 1. The display 15 may be a touch sensitive display.

In the exemplary embodiment illustrated in FIG. 4A the graphical user interface 41 comprises a plurality of user interface items 43A, 43B and 43C. It is to be appreciated that other user interface items 43 may also be available and that the user input device 17 may enable a user to access the other user interface items 43 by navigating through a menu structure.

The graphical user interface 41 illustrated in FIG. 4A may comprise a home screen. The home screen may be a default graphical user interface which may be provided as an initial graphical user interface whenever a user turns the apparatus 1 on or accesses certain applications of the apparatus 1. The user may have selected the user interface items 43A, 43B and 43C to be provided in the home screen as these may be the user interface items 43 associated with the functions which the user uses most frequently.

The first user interface item 43A is associated with the camera functions of the apparatus 1. In response to user selection of the first user interface item 43A the controller 4 provides access to the camera functions and enables images or videos to captured.

The second user interface item 43B is associated with the function "twitter". In response to user selection of the second user interface item 43B the controller 4 provides access to a twitter application which enables a user to access the social networking application.

The third user interface item 43C is associated with the function "alarm". In response to user selection of the third user interface item 43C the controller 4 provides access to the alarm functions of the apparatus 1 which enables a user to set alarms and reminders. In the particular embodiments of the invention illustrated in FIGS. 4A and 4B there is no indication on the graphical user interface 41 of whether the content associated with the user interface items 43 is stored in the memory 5 or in a removable memory component 25. However, in the illustrative example, the content associated with the camera and alarm functions are stored in the one or more memories 5 of the apparatus 1 and the content associated with the "twitter" application is stored in a removable memory component 25 such as a multi media card.

In the graphical user interface 41 illustrated in FIG. 4A, the removable memory component 25 is connected to the apparatus 1 so that the controller 4 can access the "twitter" application. In FIG. 4A all of the functions associated with the displayed user interface items 43A, 43B and 43C are available to the apparatus 1 and so all of the user interface items 43A, 43B and 43C are displayed normally. User selection of any of the user interface items 43A, 43B and 43C causes access to the respective functions.

In the graphical user interface 41 illustrated in FIG. 4B, the removable memory component 25 is disconnected from the apparatus 1 so that the controller can no longer access the "twitter" application. In FIG. 4B the controller 4 has determined that the functions associated with the second user interface item 43B are not available and so has removed the second user interface item 43B from the home screen and replaced it with a replacement user interface item 45.

The replacement user interface item 45 is displayed in the home screen in the same position that was occupied by the second user interface item 43B. In the particular embodiment illustrated in FIGS. 4A and 4B the replacement user interface item 45 is approximately the same size and shape as the removed user interface item 43B. This may provide the benefit that none of the other items in the graphical user interface 41 need to be rearranged when the replacement user interface item 45 is introduced.

Having the replacement user interface item 45 approximately the same size and shape as the removed user interface item 43B may also provide the advantage that it reserves an area of a graphical user interface for the removed user interface item 43B. This may be particularly beneficial if the apparatus 1 is configured to enable a user to rearrange the user interface items 43 within a pre-determined menu structure, for example, by rearranging the user interface items within a home screen. In such embodiments of the invention the user may be able to rearrange the pre-determined menu structure using the replacement user interface item 45 instead of the removed user interface item 43B as it is approximately the same size and shape. This may make it easier for a user for a user to select where to position the user interface items within the pre-determined menu structure as they can see where the removed user interface item 43 would be positioned.

In the particular embodiment illustrated in FIG. 4B the replacement user interface item 45 comprises an icon representing a memory card. This provides an indication to the user of the apparatus 1 that the functions are unavailable because the memory card or other removable memory component 25 has been removed.

Also in the particular embodiment illustrated in FIG. 4B the replacement user interface item 45 does not include any text or images representative of the unavailable function or functions. This clearly distinguishes the replacement user interface item 45 from the other user interface items 43A and 43C which are also displayed on the display 15. This makes it clear to the user of the apparatus 1 that this is a replacement user interface item 45 which is not directly associated with any specific function of the apparatus 1 and that selection of this replacement user interface item 45 will not cause access to a function of the apparatus 1.

FIGS. 5A and 5B illustrate graphical user interfaces 41 according to another exemplary embodiment of the invention. The graphical user interface 41 illustrated in FIG. 5A corresponds to the graphical user interface 41 illustrated in FIG. 4B.

In FIG. 5B the user has used the user input device 17 to select the replacement user interface item 45. The notification 51 is displayed in response to the selection of the replacement user interface item 45. The notification 51 provides an indication to the user why the functions associated with the removed user interface item 43B are currently unavailable.

In the particular embodiment illustrated in FIGS. 5A and 5B the notification 51 providing an indication to the user why the functions associated with the removed user interface item 43B are currently unavailable is only available in response to user selection of the replacement user interface item 45. It is to be appreciated that, in other exemplary embodiments of the invention, the notification 51 may be available without the user having to select the replacement user interface item 45. For example a notification could be provided in the replacement user interface item 45 itself, so that this information is always available to the user of the apparatus 1.

Figure 6A:
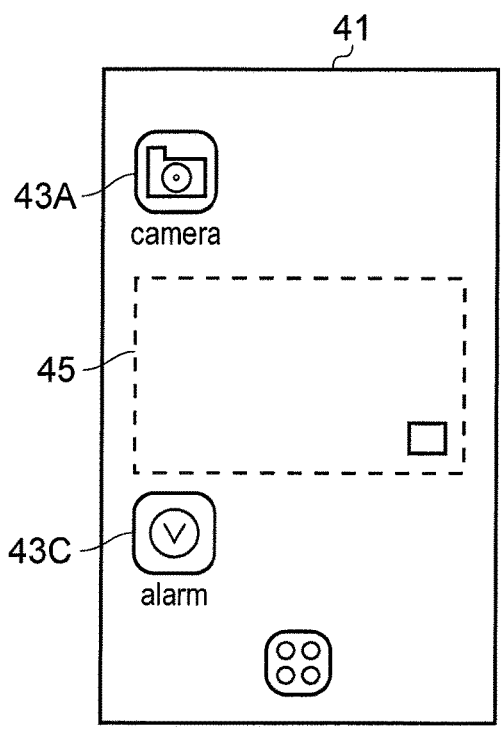
FIGS. 6A and 6B illustrate graphical user interfaces according to a further exemplary embodiment of the invention.
Figure 6B:
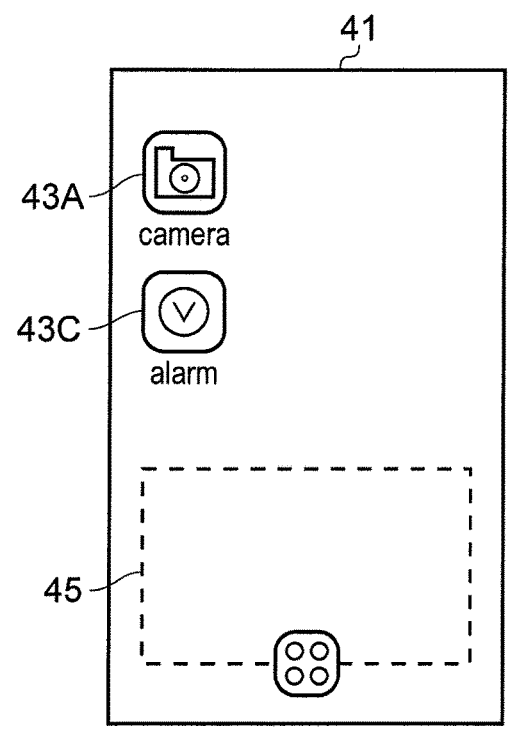

FIGS. 6A and 6B illustrate graphical user interfaces 41 according to another exemplary embodiment of the invention. The graphical user interface 41 illustrated in FIG. 6A corresponds to the graphical user interface 41 illustrated in FIGS. 4B and 5A. In FIG. 6A the user interface items 43A and 43C and the replacement user interface item 45 are displayed in the order of the original user interface items. That is there has been no change or movement of the position of the respective user interface items 43 even though some functions are currently unavailable to the apparatus 1.

In FIG. 6B the user of the apparatus has decided to remove the replacement user interface item 45 from the home screen. For example, they might not want to reconnect the removable memory component 25 and so they might not want the replacement user interface item 45 taking up space on the home screen. In the particular embodiment illustrated in FIG. 6B the user has removed the replacement user interface item 45 from the home screen by dragging the replacement user interface item 45 to the edge of the home screen. It is to be appreciated that in other embodiments of the invention other methods or user inputs could be used to remove the replacement user interface item 45 from the home screen.

Once the replacement user interface item 45 has been removed the remaining user interface items 43A and 43B may be repositioned within the home screen as illustrated in FIG. 6B.

Figure 7:
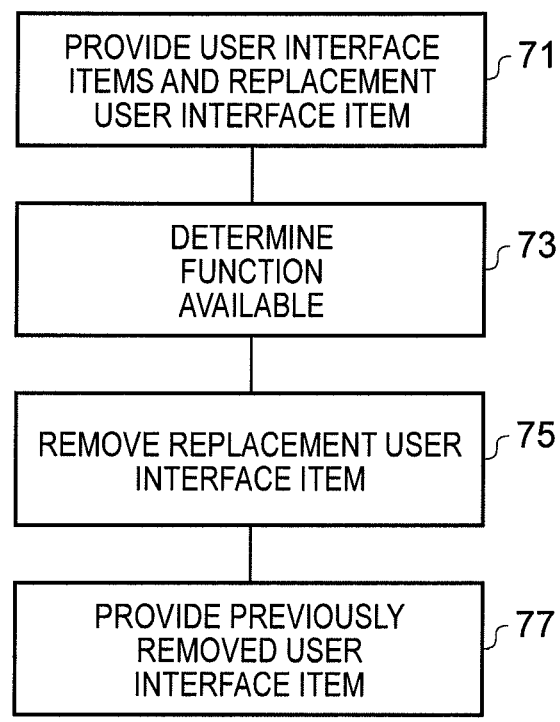
FIG. 7 is a block diagram which schematically illustrates a method according to an exemplary embodiment of the invention.

FIG. 7 schematically illustrates another method according to an exemplary embodiment of the invention. The method of FIG. 7 may occur when a previously available function becomes available again.

At block 71 a plurality of user interface items 43 are provided. As in the method illustrated in FIG. 3 the user interface items 43 may comprise any graphic, text or other information which may be displayed on the display 15 and which is associated with one or more functions of the apparatus 1 such that user selection of the user interface item 43 causes access to the one or more functions of the apparatus 1. The user interface items 43 may be arranged in a menu structure.

In the embodiments illustrated in FIG. 7 one or more replacement user interface items 45 are also provided within the menu structure as described above.

At block 73 the controller 4 determines that a function which was temporarily unavailable is now available again. For example, a removable memory component may have been reconnected, or technical issues which previously affected the function may have been resolved or a user may now be authorized to access a previously unauthorized function.

At block 75 the controller 4 removes the replacement user interface item 45 associated with the previously unavailable function from the menu structure and at block 77 replaces the replacement user interface item 45 with a user interface item 43 which is configured to provide access to the previously unavailable function in response to user selection. The user interface item 43 occupies the position within the menu structure which it originally occupied and which has been maintained by the replacement user interface item 45.

Embodiments of the invention provide the advantage that they enable a menu structure to be maintained even when functions associated with the user interface items in the menu structure are temporarily unavailable. This may make an apparatus easier for a user to use as the menu structure does not change whenever the availability of a function changes. This may be particularly beneficial if the user has arranged the user interface items into a preferential order in a menu structure such as a home screen.

Having the replacement user interface item may also provide the advantage that the user can rearrange the menu structure and/or home screen even when one or more functions are unavailable as the replacement user interface item could be repositioned in place of the removed user interface item thereby reserving the position of the removed user interface item.

Also the replacement user interface items provide a quick and simple way of providing an indication that particular functions are unavailable. In some embodiments of the invention the replacement user interface items may also provide access to further information explaining why the function is currently unavailable. The replacement user interface item also provides the advantage that the user can move the replacement user interface item in the same way that they can move the other user interface items and so they can still rearrange the predefined menu structure even if one or more functions are temporarily unavailable.

The blocks illustrated in the FIGS. 3 and 7 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

In some embodiments, the apparatus 1 comprises computational components including computer code, memory, and data processor components which in use cause the apparatus 1 to display a user interface item 43 in a screen state of the display only if a function associated with the user interface item 43 has a pre-determined state on said apparatus 1. For example, if a function is not available for some reason, the user interface item 43 is automatically removed from the displayed screen state. When the apparatus is caused to remove said user interface item 43 from a particular screen of said display in dependence on said function entering an unavailable state, the space which the user interface item 43 previously occupied in the screen is capable of being occupied by other user interface items, particularly by a user subsequently re-arranging user interface items in the menu structure shown on that screen. In such embodiments of the invention, an area of the screen positioned at the previous position of the user interface item in the menu structure displayed on screen before its removal is reserved on the screen.

The reserved area enables the removed user interface item to be restored to the reserved area automatically when the functionality on which it depends becomes available again. The reserved area which is initially reserved at the location occupied by the removed user interface item in the same screen state may be indicated graphically by a replacement user interface item 45 in some embodiments of the invention. The reserved area is present in all displayed states of that screen in which the removed user interface item would otherwise have been displayed and may be movable to another location in the same screen and/or to another screen in which case the moved area is similarly reserved for the removed user interface item to be restored to in the new location on the same or other screen(s). For example, the arrangement of user interface items comprising a menu structure forming a home screen may form a home screen which is extended over a plurality of screens and/or having a plurality of display states. The reserved area retains its reserved state for the duration the function is determined to have an unavailable state which prevents the reserved area from being occupied by other user interface items whilst the removed user interface item is unavailable.

According to the above exemplary embodiments, in a screen which includes a said reserved area another user interface item is not able to occupy any part of the area reserved in that position of the screen for the return of the removed user interface item. When a new menu structure is generated for a particular screen by rearranging one or more user interface items displayed on the screen (or by adding or deleting a user interface item), it is not possible for new user interface items to be positioned in some or all of the area reserved for the missing user interface item unless the area reserved is relocated to a new position. This ensures that regardless of whether new menu structures are formed by a user or automatically, any new user interface item is automatically prevented from occupying the position of the reserved area so that an area is always reserved for the return of the temporarily missing user interface item. If the reserved area is moved, when the removed user interface item is restored, it is automatically restored to the new position of the reserved area.

In some embodiments it is possible for the reserved area to be moved to another screen to generate a new menu structure for that screen when the temporarily missing user interface item is restored.

In some embodiments, where the boundaries of the moveable reserved area are marked by indicating the reserved area on screen using a suitable replacement user interface item displayed only for the duration of unavailability of the function on which the display of the original user interface item 43 is dependent on, the reserved area has the same outline as the missing user interface item. In other embodiments, the displayed replacement user interface item 45 occupies an area with a different outline, for example, the outline may have a different shape and/or size and the additional reserved area corresponding to the outline of the temporarily unavailable item which is not encompassed by the outline of the replacement user interface item may not be visibly displayed. In such embodiments, if a user of the device tries to occupy a part of the reserved area which is not indicated visibly with a user interface item, the user interface item may be automatically moved to occupy a suitable location just outside the reserved area. In this way, when the replacement user interface item is automatically removed when the original user interface item is restored, the menu structure of other items provided in a particular screen does not change and by reserving an area of a screen for the temporarily removed user interface item to be restored to, new content which could otherwise take the position of the "missing" user interface item, is prevented from occupying the area formerly used by the temporarily unavailable user interface item.

The unavailable state of the function on which the display of the user interface item is dependent in some embodiments may be triggered on a resource required by the function not being available. For example, the display of the user interface item may be dependent on a function having a particular state, such as being able to access to data which is not available. Such data may be located on the device or on a component or peripheral device (e.g. a removable memory device) be accessed via a communications link. Remote data may be unavailable due to lack of a suitable communications link, for example, the communications link may be required to have one or more characteristics (for example, a minimum bandwidth or latency or jitter characteristic). Loss of functionality due to loss of access to data can result from causes such as removal or incorrect positioning of a memory storage component storing data required by the function and/or result from access rights to a data source for the data used by the function being disrupted, for example, if one or more security conditions are met for granting access rights to the data.

Some embodiments of the invention use a menu structure comprising a displayed arrangement of user interface items in which the positions of user interface items are pre-determined. User interface items may be pre-defined within the menu structure. If a menu structure is pre-determined or pre-defined prior to a replacement item being provided for a user interface item removed from the displayed menu structure (also referred to herein as a pre-defined menu structure), the menu structure may be reconfigurable so that new user interface items can be added to/removed from/rearranged within the menu structure and/or if as any other resources and/or settings of the device affecting the menu structure change.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves.

Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read.

The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
displaying a user interface item associated with an application in a first area of a displayed menu structure shown on a display of an apparatus;
determining that the application causing display of the user interface item is unavailable, wherein the application associated with the user interface item is determined to be unavailable due to the removal of a removable memory that is required to implement the application;
removing the user interface item associated with the application that is determined to be unavailable from the displayed menu structure, wherein the user interface item associated with the application was previously displayed prior to the removal of the removable memory that is required to implement the application and the user interface item associated with the application is removed in response to the removal of the removable memory that is required to implement the application while the menu structure continues to be shown on the display;
reserving the first area as a movable reserved area in the display of the menu structure at the position previously occupied by the removed user interface item, the movable reserved area is visually distinctive relative to the user interface item;
wherein the moveable reserved area is moveable in a same way as a displayed user interface item in the menu structure so as to permit the menu structure including the moveable reserved area to be rearranged;

in response to user selection of the moveable reserved area, modifying the movable reserved area to include, within the moveable reserved area, an indication as to why the application associated with the user interface item is unavailable; and automatically displaying the user interface item in the moveable reserved area when the application causing the display of the user interface item becomes available.

2. A method as claimed in claim 1, wherein an indication of the moveable reserved area is provided by a replacement user interface item.

3. A method as claimed in claim 2, wherein the replacement user interface item reserves an area the same size and shape as the removed user interface item.

4. A method as claimed in claim 2, wherein the replacement user interface item is configured such that selection of the replacement user interface item will not cause access to the application associated with the removed user interface item.

5. A method as claimed in claim 1, further comprising:
providing a plurality of user interface items in the menu structure where each user interface item is associated with at least one function of an apparatus.

6. A method as claimed in claim 2, wherein the menu structure is a pre-defined menu structure, and wherein the method comprises:
maintaining the pre-defined menu structure by providing the replacement user interface item in the position of the pre-defined menu structure previously occupied by the removed user interface item to reserve said area.

7. A method as claimed in claim 1, wherein the menu structure comprises a home screen.

8. A method as claimed in claim 1, wherein the method further comprises determining that the application which is associated with the removed user interface item is available again.

9. A method as claimed in claim 1, wherein the moveable reserved area is located, following its movable rearrangement, in a different area of the display than the first area, and wherein the user interface item is displayed in the different area when the application becomes available again without the user interface item having been moved from the first area to the different area.

10. A method as claimed in claim 1, wherein the moveable reserved area is blank prior to receiving the user selection of the moveable reserved area that causes the moveable reserved area to be modified to include, within the moveable reserved area, the indication as to why the application associated with the user interface item is unavailable.

11. A method as claimed in claim 1, wherein the indication as to why the application associated with the user interface item is unavailable at least partially overlaps the moveable reserved area.

12. An apparatus comprising:
at least one processor; and
at least one memory including computer program code;
wherein the at least one memory and the computer program code are configured to, with the at least one processor, enable the apparatus to:
display a user interface item associated with an application in a first area of a displayed menu structure shown on a display of an apparatus;
determine that the application causing display of the user interface item provided in a menu structure of the apparatus is unavailable, wherein the application associated with the user interface item is determined to be unavailable due to the removal of a removable memory that is required to implement the application;

remove the user interface item associated with the application that is determined to be unavailable from the menu structure from a position in the displayed menu structure, wherein the user interface item associated with the application was previously displayed prior to the removal of the removable memory that is required to implement the application and the user interface item associated with the application is removed in response to the removal of the removable memory that is required to implement the application while the menu structure continues to be shown on the display;

reserve the first area as a movable reserved area in the display of the menu structure at the position previously occupied by the removed user interface item, wherein the movable reserved area is visually distinctive relative to the user interface item, wherein the movable reserved area is moveable in a same way as a displayed user interface item in the menu structure so as to permit the menu structure including the moveable reserved area reserved to be rearranged;

in response to user selection of the moveable reserved area, modify the movable reserved area to include, within the moveable reserved area, an indication as to why the application associated with the user interface item is unavailable; and automatically display the user interface item in the moveable reserved area when the application causing the display of the user interface item becomes available.

13. Apparatus as claimed in claim 12, wherein an indication of the area reserved is provided by a replacement user interface item.

14. An apparatus as claimed in claim 12, wherein the apparatus is further enabled to:
provide a plurality of user interface items in the menu structure where each user interface item is associated with at least one function of an apparatus.

15. An apparatus as claimed in claim 13, wherein the menu structure is a pre-defined menu structure and wherein the apparatus is further enabled to:
maintain the pre-defined menu structure by providing the replacement user interface item in the position of the pre-defined menu structure previously occupied by the removed user interface item to reserve said area.

16. An apparatus as claimed in claim 12, wherein the at least one memory and the computer program code are further configured to, with the at least one processor, enable the apparatus to determine that the application which is associated with the removed user interface item is available again.

17. An apparatus as claimed in claimed claim 13, wherein the replacement user interface item is the same size and shape as the removed user interface item.

18. Apparatus as claimed in claim 12, wherein the apparatus is configured to enable a user to arrange one or more said user interface items to define a menu structure of a screen displayed on the apparatus.

19. An apparatus as claimed in claim 12, wherein the moveable reserved area is located, following its movable rearrangement, in a different area of the display than the first area, and wherein the user interface item is displayed in the different area when the application becomes available again without the user interface item having been moved from the first area to the different area.

20. An apparatus as claimed in claim 12, wherein the moveable reserved area is blank prior to receiving the user selection of the moveable reserved area that causes the moveable reserved area to be modified to include, within the moveable reserved area, the indication as to why the application associated with the user interface item is unavailable.

21. A apparatus as claimed in claim 12, wherein the indication as to why the application associated with the user interface item is unavailable at least partially overlaps the moveable reserved area.

22. A non-transitory computer-readable storage medium comprising computer program instructions that, when executed by at least one processor, cause an apparatus at least to perform:
 displaying a user interface item associated with an application in a first area of a displayed menu structure shown on a display of an apparatus;
 determining that the application causing display of the user interface item of a menu structure of an apparatus is unavailable, wherein the application associated with the user interface item is determined to be unavailable due to the removal of a removable memory that is required to implement the application;
 removing the user interface item associated with the application that is determined to be unavailable from a position in the displayed menu structure, wherein the user interface item associated with the application was previously displayed prior to the removal of the removable memory that is required to implement the application and the user interface item associated with the application is removed in response to the removal of the removable memory that is required to implement the application while the menu structure continues to be shown on the display;
 reserving the first area as a moveable reserved area in the display of the menu structure at the position in the menu structure previously occupied by the removed user interface item, wherein the moveable reserved area is visually distinctive relative to the user interface item;
 wherein the moveable reserved area is moveable in a same way as a displayed user interface item in the menu structure so as to permit the menu structure including the moveable reserved area to be rearranged;
 in response to user selection of the moveable reserved area, modifying the movable reserved area to include, within the moveable reserved area, an indication as to why the application associated with the user interface item is unavailable; and
 automatically displaying the user interface item in the moveable reserved area when the application causing the display of the user interface item becomes available.

23. A computer-readable storage medium as claimed in claim 22, wherein the moveable reserved area is located, following its movable rearrangement, in a different area of the display than the first area, and wherein the user interface item is displayed in the different area when the application becomes available again without the user interface item having been moved from the first area to the different area.

24. A computer-readable storage medium as claimed in claim 22, wherein the moveable reserved area is blank prior to receiving the user selection of the moveable reserved area that causes the moveable reserved area to be modified to include, within the moveable reserved area, the indication as to why the application associated with the user interface item is unavailable.

25. A user interface comprising:
 a display configured to display a plurality of user interface items in a menu structure including a user interface item associated with an application in a first area of the displayed menu structure where each user interface item is associated with at least one application of an apparatus; such that in response to determining that the application causing display of the user interface item in the first area is unavailable due to the removal of a removable memory that is required to implement the application, the user interface item associated with the application that is determined to be unavailable is removed from the first area in the displayed menu structure and the menu structure reserves the first area as a moveable reserved area at the position in the displayed menu structure previously occupied by the removed user interface item, wherein the user interface item associated with the application was previously displayed prior to the removal of the removable memory that is required to implement the application and the user interface item associated with the application is removed in response to the removal of the removable memory that is required to implement the application while the menu structure continues to be shown on the display, and wherein the moveable reserved area is visually distinctive relative to the user interface item,
 wherein the moveable reserved area is moveable in a same way as a displayed user interface element in the menu structure so as to permit the menu structure including the moveable reserved area to be rearranged,
 wherein the display is further configured to automatically display the user interface item in the moveable reserved area when the application causing the display of the user interface item becomes available, and
 wherein the user interface further comprises a tangible user input device configured to receive user input such that in response to user selection of the moveable reserved area, the moveable reserved area is modified to include, within the moveable reserved area, an indication as to why the application associated with the user interface item is unavailable.

26. A user interface as claimed in claim 25, wherein the moveable reserved area is located, following its movable rearrangement, in a different area of the display than the first area, and wherein the user interface item is displayed in the different area when the application becomes available again without the user interface item having been moved from the first area to the different area.

27. A user interface as claimed in claim 25, wherein the moveable reserved area is blank prior to receiving the user selection of the moveable reserved area that causes the moveable reserved area to be modified to include, within the moveable reserved area, the indication as to why the application associated with the user interface item is unavailable.

* * * * *